(12) United States Patent
Ito et al.

(10) Patent No.: US 11,986,903 B2
(45) Date of Patent: May 21, 2024

(54) LASER PROCESSING MACHINE AND CONTROL METHOD THEREFOR

(71) Applicant: AMADA CO., LTD., Kanagawa (JP)

(72) Inventors: Satoshi Ito, Kanagawa (JP); Atsuya Tanaka, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 452 days.

(21) Appl. No.: 17/282,405

(22) PCT Filed: Sep. 26, 2019

(86) PCT No.: PCT/JP2019/037840
§ 371 (c)(1),
(2) Date: Apr. 2, 2021

(87) PCT Pub. No.: WO2020/071232
PCT Pub. Date: Apr. 9, 2020

(65) Prior Publication Data
US 2021/0379696 A1    Dec. 9, 2021

(30) Foreign Application Priority Data

Oct. 4, 2018 (JP) ................................. 2018-189330
Sep. 17, 2019 (JP) ................................. 2019-168184

(51) Int. Cl.
*B23K 26/08*     (2014.01)
*B23K 26/03*     (2006.01)
*B23K 26/38*     (2014.01)

(52) U.S. Cl.
CPC ...... *B23K 26/0838* (2013.01); *B23K 26/0344* (2015.10); *B23K 26/0876* (2013.01); *B23K 26/38* (2013.01)

(58) Field of Classification Search
CPC ............ B23K 26/0344; B23K 26/0838; B23K 26/0869; B23K 26/0876; B23K 26/38;
(Continued)

(56) References Cited

U.S. PATENT DOCUMENTS 5,185,510 A    2/1993  Zumstein

FOREIGN PATENT DOCUMENTS

JP    2002-172482 A    6/2002
JP    2002172482    *    6/2002
(Continued)

OTHER PUBLICATIONS

English Language Translation of Cited JP2014034043 (Year: 2014).*
(Continued)

*Primary Examiner* — Dana Ross
*Assistant Examiner* — Joseph W Iskra
(74) *Attorney, Agent, or Firm* — Renner, Otto, Boisselle & Sklar, LLP

(57) ABSTRACT

Provided is a laser processing machine including a laser head capable of irradiating a workpiece with laser beam, a belt conveyor provided away in an irradiation direction of the laser beam, and a control unit configured to control operations of the laser head and the belt conveyor. The laser head is configured to be movable along at least a rotating direction of the belt conveyor. The control unit is configured to control, in a case where a moving direction and a moving speed of the laser head match the rotating direction and a rotating speed of the belt conveyor during the irradiation with the laser beam, the operation of at least one of the laser head and the belt conveyor in order to avoid the matching.

17 Claims, 5 Drawing Sheets

(58) Field of Classification Search
CPC .............. B23K 26/702; B23K 37/0235; B23K 37/0408
USPC .................................................. 219/121.67
See application file for complete search history.

(56) References Cited

FOREIGN PATENT DOCUMENTS

| | | |
|---|---|---|
| JP | 2014-34043 A | 2/2014 |
| JP | 2014-83590 A | 5/2014 |

OTHER PUBLICATIONS

Extended European Search Report for corresponding EP Application No. 19869767.4 dated Dec. 7, 2021.
International Search Report for corresponding Application No. PCT/JP2019/037840, mailed Nov. 26, 2019.
Office Action in corresponding Japanese Patent Application No. 2019-168184, issued Nov. 19, 2019.

* cited by examiner

LASER PROCESSING MACHINE AND CONTROL METHOD THEREFOR

TECHNICAL FIELD

The present invention relates to a laser processing machine and a control method therefor.

BACKGROUND ART

As a laser processing machine that performs cutting or drilling on various workpieces with laser, a machine is known that includes a pallet (a table) on which a workpiece is mounted, a laser head provided above this pallet, and a belt conveyor provided below the pallet (see Patent Literature 1, for example).

With the laser head, the workpiece is irradiated with laser beam, for example, to cut the workpiece mounted on the pallet. The pallet includes, for example, a configuration where a plurality of metal plates each molded into a comb tooth shape are arranged in parallel, and scrap (waste) generated by laser processing is dropped onto the belt conveyor through a gap between adjacent metal plates. The belt conveyor includes a belt made of a metal such as iron that is not melted easily by the irradiation with the laser beam, receives scrap or a processed article such as a product that drops downward with the laser processing, and conveys this scrap or article toward a scrap box installed at a turning point of the belt conveyor.

CITATION LIST

Patent Literature

Patent Literature 1: Japanese Patent Laid-Open No. 2002-172482

SUMMARY

Technical Problem

In such a conventional laser processing machine, normally, a laser head and a workpiece are relatively moved in a state where laser beam is passed through the workpiece, for example, to cut the workpiece.

Consequently, the laser beam passed through the workpiece during laser processing continues to be radiated toward a belt conveyor. In the conventional laser processing machine, when the laser beam substantially reaches the belt conveyor, a spot diameter of the laser beam increases, and a laser power density decreases. Therefore, any problem that is enough to melt the belt conveyor does not occur.

In recent years, however, improvement in technology of adjusting the spot diameter of the laser beam or the like has made it possible to increase an output of the laser beam and decrease the spot diameter. In a case of performing the laser processing with the laser beam having the high output and small diameter, for example, if a moving direction and moving speed of the laser head match a moving direction and moving speed of the belt conveyor, the belt conveyor continues to be irradiated with the laser beam having a high laser power density, and there is concern that the belt conveyor is melted.

The present invention has been made in view of the above circumstances, and an object of the present invention is to provide a laser processing machine capable of preventing a belt conveyor from being melted by laser beam and a control method therefor.

Solution to Problem

A laser processing machine according to the present invention includes: a laser head configured to irradiate a workpiece with laser beam; a belt conveyor provided away in an irradiation direction of the laser beam; and a control unit configured to control operations of the laser head and the belt conveyor, the laser head is configured to be movable along at least a rotating direction of the belt conveyor, and the control unit is configured to control, in a case where a moving direction and a moving speed of the laser head match the rotating direction and a rotating speed of the belt conveyor during the irradiation with the laser beam, the operation of at least one of the laser head and the belt conveyor in order to avoid the matching.

In the laser processing machine according to the present invention, the laser head may be configured to operate based on a preset operation program, the belt conveyor may be configured to continuously operate in a preset rotating direction and at a preset rotating speed, and the control unit may analyze the operation program and calculate beforehand timing at which the moving direction and moving speed of the laser head match the rotating direction and rotating speed of the belt conveyor, and may be triggered at the timing to control the operation of at least one of the laser head and the belt conveyor.

In the laser processing machine according to the present invention, the control unit may determine that the moving speed of the laser head matches the rotating speed of the belt conveyor, when the moving speed of the laser head is within a preset range to the rotating speed of the belt conveyor, and may determine that the moving direction of the laser head matches the rotating direction of the belt conveyor, in a case where the rotating direction of the belt conveyor agrees with the moving direction of the laser head, and in a case where the laser head moves at a moving speed that is less than or equal to a preset speed, in the moving direction of the laser head that is orthogonal to the rotating direction of the belt conveyor in a horizontal plane.

In the laser processing machine according to the present invention, the control unit may specify, from the moving direction and moving speed of the laser head, a speed of a rotating direction component of the laser head along the rotating direction of the belt conveyor, and may determine that the moving direction and moving speed of the laser head match the rotating direction and rotating speed of the belt conveyor, when the speed of the rotating direction component is within a preset range to the rotating speed of the belt conveyor.

In the laser processing machine according to the present invention, the control unit may execute a melting prevention run of repeating temporary stop of the operation and a rotating operation of the belt conveyor, in a case where the moving direction and moving speed of the laser head match the rotating direction and rotating speed of the belt conveyor.

In the laser processing machine according to the present invention, the control unit may execute a melting prevention run of repeating speed change of the rotating speed of the belt conveyor, in a case where the moving direction and moving speed of the laser head match the rotating direction and rotating speed of the belt conveyor.

In the laser processing machine according to the present invention, the control unit may execute a melting prevention run of repeating forward rotation and reverse rotation in the rotating direction of the belt conveyor, in a case where the moving direction and moving speed of the laser head match the rotating direction and rotating speed of the belt conveyor.

In the laser processing machine according to the present invention, the control unit may execute a melting prevention run of repeating the operation of the laser head and temporary stop and movement of the irradiation with the laser beam, in a case where the moving direction and moving speed of the laser head match the rotating direction and rotating speed of the belt conveyor.

In the laser processing machine according to the present invention, the melting prevention run may be executed after a predetermined time has elapsed since the moving direction and moving speed of the laser head matched the rotating direction and rotating speed of the belt conveyor.

A control method for a laser processing machine according to the present invention is a control method for a laser processing machine including: a laser head configured to irradiate a workpiece with laser beam; and a belt conveyor provided away in an irradiation direction of the laser beam, the laser head being configured to be movable along at least a rotating direction of the belt conveyor, the control method including controlling, in a case where a moving direction and a moving speed of the laser head match the rotating direction and a rotating speed of the belt conveyor during the irradiation with the laser beam, an operation of at least one of the laser head and the belt conveyor in order to avoid the matching.

The control method for the laser processing machine according to the present invention may further include analyzing an operation program of the laser head and calculating beforehand timing at which the moving direction and moving speed of the laser head match the rotating direction and rotating speed of the belt conveyor, and in the controlling, the control of the operation of at least one of the laser head and the belt conveyor may be triggered at the timing.

In the control method for the laser processing machine according to the present invention, the controlling may include determining that the moving speed of the laser head matches the rotating speed of the belt conveyor, when the moving speed of the laser head is within a preset range to the rotating speed of the belt conveyor; and determining that the moving direction of the laser head matches the rotating direction of the belt conveyor, in a case where the rotating direction of the belt conveyor agrees with the moving direction of the laser head, and in a case where the laser head moves at a moving speed that is less than or equal to a preset speed, in the moving direction of the laser head that is orthogonal to the rotating direction of the belt conveyor in a horizontal plane.

In the control method for the laser processing machine according to the present invention, the controlling may include: specifying, from the moving direction and moving speed of the laser head, a speed of a rotating direction component of the laser head along the rotating direction of the belt conveyor; and determining that the moving direction and moving speed of the laser head match the rotating direction and rotating speed of the belt conveyor, when the speed of the rotating direction component is within a preset range to the rotating speed of the belt conveyor.

In the control method for the laser processing machine according to the present invention, the controlling may include executing a melting prevention run of repeating temporary stop of the operation and a rotating operation of the belt conveyor, in a case where the moving direction and moving speed of the laser head match the rotating direction and rotating speed of the belt conveyor.

In the control method for the laser processing machine according to the present invention, the controlling may include executing a melting prevention run of repeating speed change of the rotating speed of the belt conveyor, in a case where the moving direction and moving speed of the laser head match the rotating direction and rotating speed of the belt conveyor.

In the control method for the laser processing machine according to the present invention, the controlling may include executing a melting prevention run of repeating forward rotation and reverse rotation in the rotating direction of the belt conveyor, in a case where the moving direction and moving speed of the laser head match the rotating direction and rotating speed of the belt conveyor.

In the control method for the laser processing machine according to the present invention, the controlling may include executing a melting prevention run of repeating the operation of the laser head and temporary stop and movement of the irradiation with the laser beam, in a case where the moving direction and moving speed of the laser head match the rotating direction and rotating speed of the belt conveyor.

In the control method for the laser processing machine according to the present invention, the melting prevention run may be executed after a predetermined time has elapsed since the moving direction and moving speed of the laser head matched the rotating direction and rotating speed of the belt conveyor.

Furthermore, a laser processing machine according to the present invention includes: a laser head configured to irradiate a workpiece with laser beam; a belt conveyor provided away in an irradiation direction of the laser beam; and a control unit configured to control operations of the laser head and the belt conveyor, the laser head is configured to be movable along at least a rotating direction of the belt conveyor, and the control unit is configured to repeat temporary stop of the operation and a rotating operation of the belt conveyor, to repeat speed change of the rotating speed of the belt conveyor, or to repeat forward rotation and reverse rotation in the rotating direction of the belt conveyor.

Advantageous Effect of Invention

According to the present invention, there can be provided a laser processing machine capable of preventing a belt conveyor from being melted by laser beam and a control method therefor.

DESCRIPTION OF EMBODIMENTS

Hereinafter, a laser processing machine according to each embodiment of the present invention and a control method therefor will be described in detail with reference to the accompanying drawings. However, the following embodiment does not restrict the invention according to each claim, and all combinations of features described in the embodiment are not necessarily essential for solutions of the invention.

First Embodiment

First, description will be made as to a laser processing machine according to a first embodiment of the present invention with reference to FIG. 1 to FIG. 6. Note that in the following embodiment, all contents described in publication of Japanese Patent Laid-Open No. 2002-172482 can be incorporated as a whole herein by reference, and hence, as a laser processing machine according to the present invention, a laser processing machine 100 including a configuration similar to a laser processing machine described in the publication of Japanese Patent Laid-Open No. 2002-172482 will be described as an example.

[Entire Configuration of Laser Processing Machine]

Figure 1:
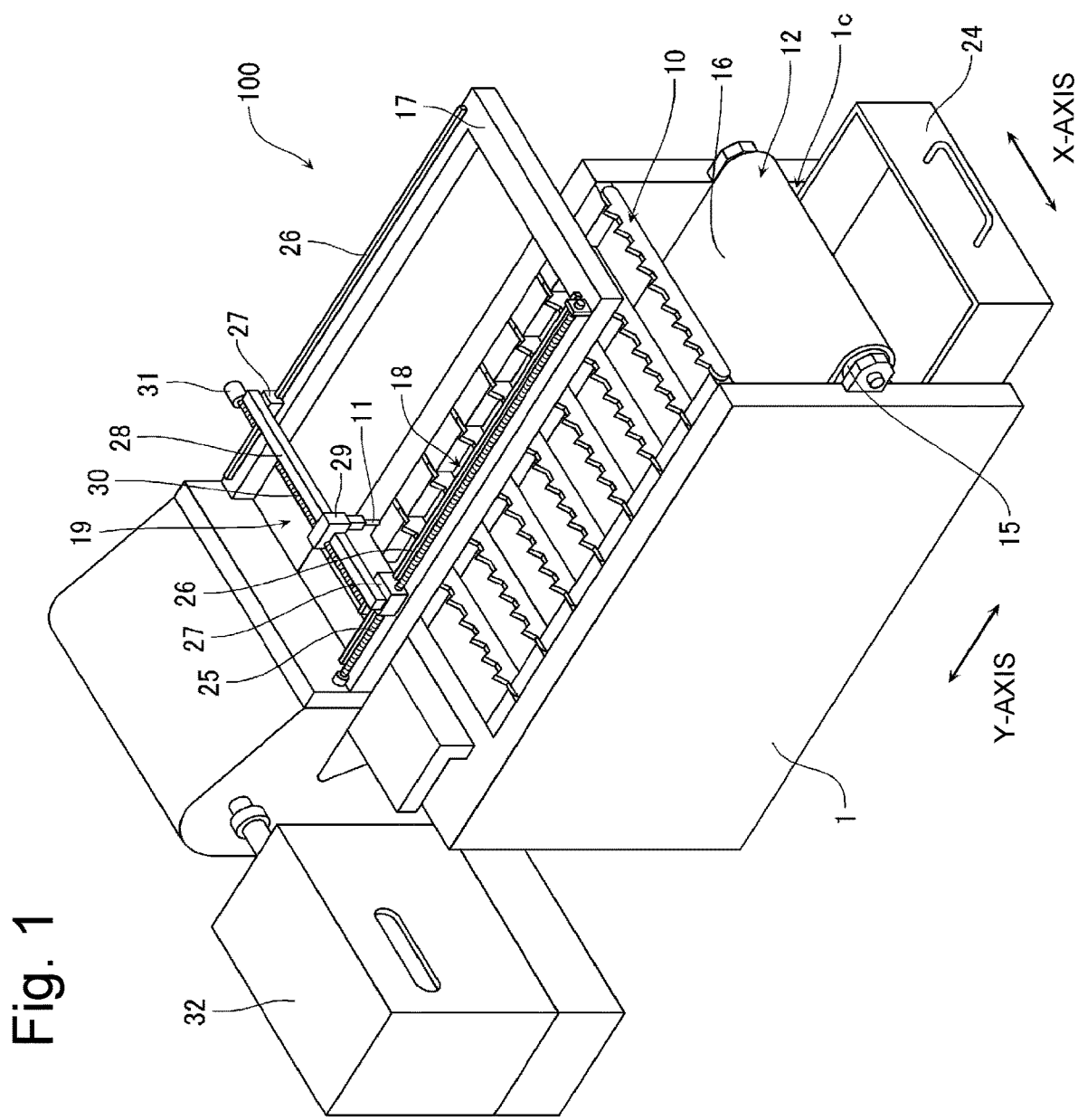
FIG. 1 is a perspective view schematically showing an entire configuration of a laser processing machine according to an embodiment of the present invention.

As shown in FIG. 1, the laser processing machine 100 according to the present embodiment includes a pallet 10 on which a workpiece (not shown) is mounted, a laser head 11 provided above the pallet 10, and capable of irradiating the workpiece on the pallet 10 with laser beam, and a belt conveyor 12 provided below the pallet 10, and rotatable, for example, in a Y-axis direction that is a first direction. Note that in the following description, "the Y-axis direction" means a rotating direction of the belt conveyor 12, and "an X-axis direction" means a direction orthogonal to the Y-axis direction in a horizontal plane.

Figure 2:
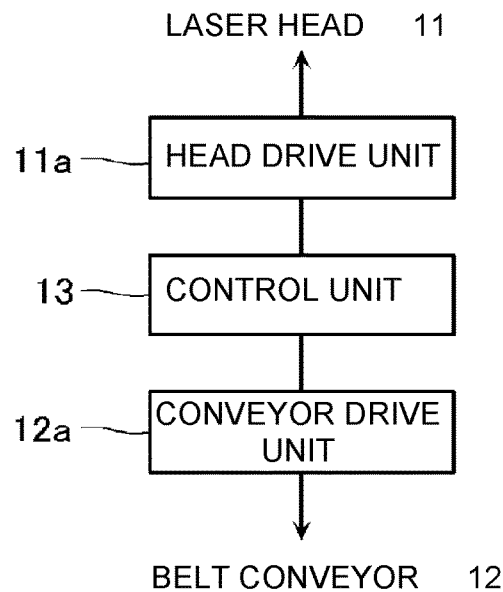
FIG. 2 is a block diagram schematically showing a configuration of a drive control system of the laser processing machine.

Furthermore, as shown in FIG. 2, the laser processing machine 100 includes a control unit 13 that controls operations of the laser head 11 and the belt conveyor 12. The control unit 13 is connected to a head drive unit 11a that drives the laser head 11, and a conveyor drive unit 12a that drives the belt conveyor 12.

As shown in FIG. 1, the laser processing machine 100 includes a frame 1 having a central portion formed with an opening 1c. The pallet 10 is disposed on an upper side in the opening 1c of this frame 1, and the belt conveyor 12 is disposed on a lower side. A storage box 24 that is drawable in the Y-axis direction is provided below an end of the belt conveyor 12 on a downstream side in the rotating direction.

The pallet 10 is provided as a support that supports the workpiece or a product, on the upper side in the opening 1c of the frame 1. The pallet 10 includes a configuration in which a plurality of metal plates each molded into a comb tooth shape as shown in the drawing are arranged in parallel in the Y-axis direction. Consequently, the pallet 10 is configured so that the product (a processed article) or scrap cut by laser processing can drop down toward the belt conveyor 12. Note that the pallet 10 is not limited to a shown example, and various configurations, for example, a so-called openable/closable support may be adopted.

The belt conveyor 12 is provided away in an irradiation direction of the laser beam, on a lower side below the pallet 10, and configured to convey, toward the storage box 24, the product (the processed article) or the scrap cut by the laser processing and dropped via the pallet 10. This belt conveyor 12 includes rotating rollers 15 provided on opposite end sides in the Y-axis direction, a belt 16 made of a metal and wound around the rollers, and a conveyor drive motor (not shown) that rotates one rotating roller 15, to form the conveyor drive unit 12a.

The laser head 11 is an all-scanning laser head that is movable in the Y-axis direction and the X-axis direction, and is supported via a Y-axis movement mechanism 18 and an X-axis movement mechanism 19 by an upper frame 17 having a substantially square shape projected in an upper region of the pallet 10. Note that it is described in the present embodiment that the laser head 11 is the all-scanning laser head, but the laser head is not limited to this embodiment as long as the laser head is movable in the same direction as at least the rotating direction of the belt conveyor 12.

The Y-axis movement mechanism 18 includes a pair of Y-axis guide rails 26, 26 extending along the Y-axis direction, a pair of Y-axis sliders 27, 27 provided slidably on the Y-axis guide rails 26, 26, respectively, a Y-axis carriage 28 bridged over a space between the pair of Y-axis sliders 27, 27, a Y-axis ball screw 25 extending along the Y-axis direction outside one Y-axis guide rail 26, and screwed into one Y-axis slider 27, and a Y-axis drive motor (not shown) that rotates the Y-axis ball screw 25. The Y-axis drive motor is connected to the control unit 13. According to such a configuration, when the control unit 13 drives the Y-axis drive motor, the Y-axis ball screw 25 is rotated, and this rotation moves, in the Y-axis direction, the Y-axis sliders 27, 27 guided by the Y-axis guide rails 26, 26, thereby moving the Y-axis carriage 28 in the same direction.

The X-axis movement mechanism 19 includes an X-axis carriage 29 provided movably in the X-axis direction on the Y-axis carriage 28, an X-axis ball screw 30 extending along the X-axis direction on the Y-axis carriage 28, and screwed into the X-axis carriage 29, and an X-axis drive motor 31 that rotates the X-axis ball screw 30. The X-axis drive motor 31 is connected to the control unit 13. According to such a configuration, when the control unit 13 drives the X-axis drive motor 31, the X-axis ball screw 30 is rotated, and this rotation moves the X-axis carriage 29 in the X-axis direction relative to the Y-axis carriage 28.

Furthermore, the laser head 11 is mounted to the X-axis carriage 29, to be movable in an up-down direction by an unshown actuator or the like. That is, the laser head 11 is moved in the Y-axis direction by the Y-axis movement mechanism 18, is moved in the X-axis direction by the X-axis movement mechanism 19, and is additionally configured to be movable also in a vertical direction (a Z-axis direction orthogonal to the Y-axis direction and the X-axis direction). Note that the head drive unit 11a is constituted of the X-axis drive motor 31, the Y-axis drive motor, the actuator and others.

In the laser processing machine 100 including this configuration, the laser processing is performed as follows. That is, during the laser processing, the control unit 13 outputs a control signal (a drive signal, a stop signal or the like) to the conveyor drive unit 12a, and the belt conveyor 12 is driven to rotate in the Y-axis direction. Also, the control unit 13 outputs a control signal to the head drive unit 11a, to move the laser head 11 in the Y-axis direction, the X-axis direction and the Z-axis direction.

At this time, the laser beam output from a laser oscillator 32 is sent to the laser head 11 via an unshown bend mirror, to irradiate a workpiece on the pallet 10 with the laser beam from the laser head 11. In this way, the laser processing is performed at a desired position of the workpiece with the laser beam. Then, a laser processed product or scrap drops down onto the belt conveyor 12 through a gap between respective metal plates of the pallet 10, and is conveyed to the storage box 24.

Thus, the laser processing is performed. In the laser processing machine 100 of the present embodiment and a control method therefor, to prevent the belt 16 of the belt conveyor 12 from being melted by the laser beam radiated during the laser processing, the control unit 13 controls the operation of at least one of the laser head 11 and belt conveyor 12 so that a relative moving speed of the laser head 11 and the belt conveyor 12 does not turn to 0 (zero).

Specifically, in a case where a moving direction and a moving speed of the laser head 11 match the rotating direction and rotating speed of the belt conveyor 12 during the irradiation of the workpiece with the laser beam from the laser head 11, the control unit 13 may control these operations in order to avoid the matching. Note that "the matching" described herein is for use in a sense including not only a case of complete matching but also a predetermined range.

Here, the predetermined range includes such a case as described later, concerning the moving direction of the laser head 11 and the rotating direction of the belt conveyor 12. For example, the rotating direction of the belt conveyor 12 is a + (forward) Y-axis direction toward the storage box 24 on an equipment front side, or a − (reverse) Y-axis direction toward the laser oscillator 32 on an equipment rear side. Following this law, similarly, the moving direction of the laser head 11 is the +Y axis direction and the −Y axis direction.

Then, for example, when the belt conveyor 12 rotates in the +Y axis direction, a case where the moving direction of the laser head 11 is not the +Y axis direction but is a slightly inclined direction to the +Y axis direction is also included in a case where the moving direction matches the rotating direction. Here, "the slightly inclined direction" is a direction in which a moving speed component of the laser head 11 in the direction (the X-axis direction) orthogonal to the +Y axis direction in the horizontal plane moves, for example, at a speed of 300 mm or less per minute. This also applies to a case where the belt conveyor 12 and the laser head 11 are driven in the −Y axis direction and the −Y axis direction, respectively.

A value of this speed component indicating the speed of 300 mm or less per minute is obtained in advance based on experiments, calculations and the like, and is set and stored as a parameter in a memory of the control unit 13. Note that a method of obtaining this value first includes obtaining a minimum spot diameter (e.g., 30 mm) of the laser beam when the laser beam radiated from the laser head 11 reaches the belt conveyor 12, next confirming a melted situation of the belt conveyor 12 while variously changing the moving speed of the laser head 11 (the laser beam), and finally setting the rotating speed (e.g., a speed of 300 mm per minute (a speed of 5 mm per second) or less) of the belt conveyor 12 in a case where the belt conveyor 12 may be melted, to obtain the value. In this example, the laser head 11 moves by a distance twice the minimum spot diameter in six seconds. Therefore, if the laser head 11 moves only by a distance shorter than the distance twice the minimum spot diameter, the belt 16 of the belt conveyor 12 might be melted. On the other hand, it can be considered that if the laser head 11 moves by a distance longer than the distance twice the minimum spot diameter of the laser beam, the belt 16 of the belt conveyor 12 is unlikely to be melted. Note that this value varies with the configuration of the laser processing machine 100 or the belt conveyor 12, the output of the laser oscillator 32 or the like, and hence, individually set parameters can be changed and stored.

Furthermore, the predetermined range includes such a case as described later, concerning the moving speed of the laser head 11 and the rotating speed of the belt conveyor 12. For example, a case where the rotating speed of the belt conveyor 12 is a speed of 2800 mm or more and 3400 mm or less per minute is included in the case where the moving speed matches the rotating speed, when the moving speed of the laser head 11 is within a preset range (e.g., within a range of ±20%) to the rotating speed of the belt conveyor 12.

In the above case, specifically, a value of −20% of the above numeric value of the rotating speed of the belt conveyor 12 to a lower limit value is a speed of 2240 mm per minute, and a value of +20% of the above numeric value to an upper limit value is a speed of 4080 mm per minute. Therefore, a case where the moving speed of the laser head 11 is within a range of a speed of 2240 mm or more and 4080 mm or less per minute is included in the case where the moving speed matches the rotating speed.

More specifically, in a case where the rotating speed of the belt conveyor 12 is a speed of 2800 mm per minute, when the moving speed of the laser head 11 is in a range of a speed of 2240 mm or more and 3360 mm or less per minute, it may be determined that the moving speed matches the rotating speed. Furthermore, in a case where the rotating speed of the belt conveyor 12 is a speed of 3400 mm per minute, when the moving speed of the laser head 11 is in a range of a speed of 2720 mm or more and 4080 mm or less per minute, it may be determined that the moving speed matches the rotating speed. Hereinafter, description will be made as to a control method for the laser processing machine 100 to prevent the belt 16 of the belt conveyor 12 from being melted.

[Prevention of Melting of Belt Conveyor of Laser Processing Machine]

Figure 3:
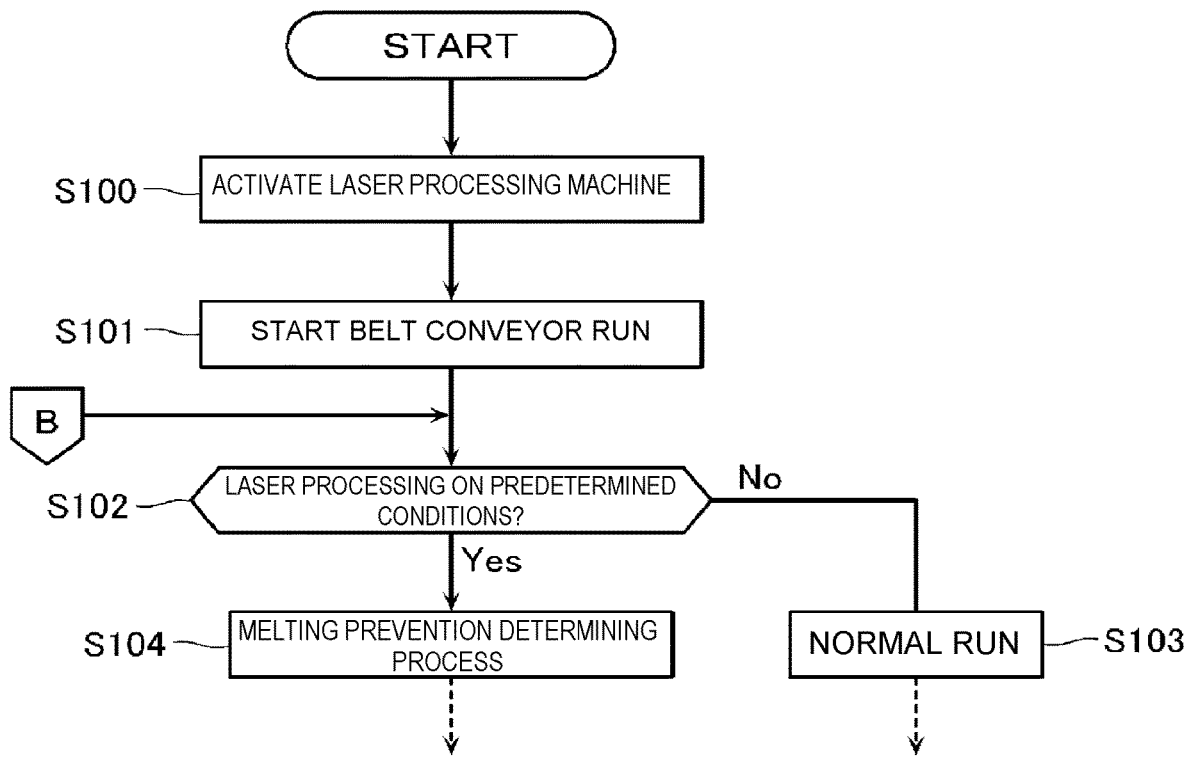
FIG. 3 is a flowchart showing a control method for the laser processing machine.

As shown in FIG. 3, first, the laser processing machine 100 is activated by turning on a power source or otherwise (step S100), and the control unit 13 outputs the drive signal to the conveyor drive unit 12a, to start a run of the belt conveyor 12 (step S101). Subsequently, the control unit 13 outputs the drive signal to the head drive unit 11a as required based on an operation program of the laser head 11, to drive the laser head 11, thereby starting a normal run of the laser processing.

Then, the control unit 13 determines whether or not the laser processing to be performed by the laser processing machine 100 is laser processing on predetermined conditions on which melting prevention has to be executed (step S102). The determination in this step S102 is specifically performed, for example, as follows.

That is, the control unit 13 reads respective numeric values of NC parameter concerning the laser processing that are stored in storage means such as an HDD, SSD or the like provided in itself. Then, based on the read numeric values, the control unit 13 compares, with a set threshold value, a determination item, for example, whether or not a fiber laser oscillator with a predetermined output value (e.g., 6 kW) or more is mounted as the laser oscillator 32 in the laser processing machine 100, whether or not a value of laser peak power is larger than a set threshold value, or whether or not the fiber laser oscillator is to be used. For example, if the determination item is satisfied as a result of this comparison, it is determined that the laser processing satisfies the predetermined conditions.

In this step S102, if the control unit 13 determines that the laser processing does not satisfy the predetermined conditions (no in the step S102), the control unit shifts to the normal run of step S103. On the other hand, in the step S102, if the control unit 13 determines that the laser processing satisfies the predetermined conditions (yes in the step S102), the control unit shifts to a melting prevention determining process of step S104.

Figure 4:
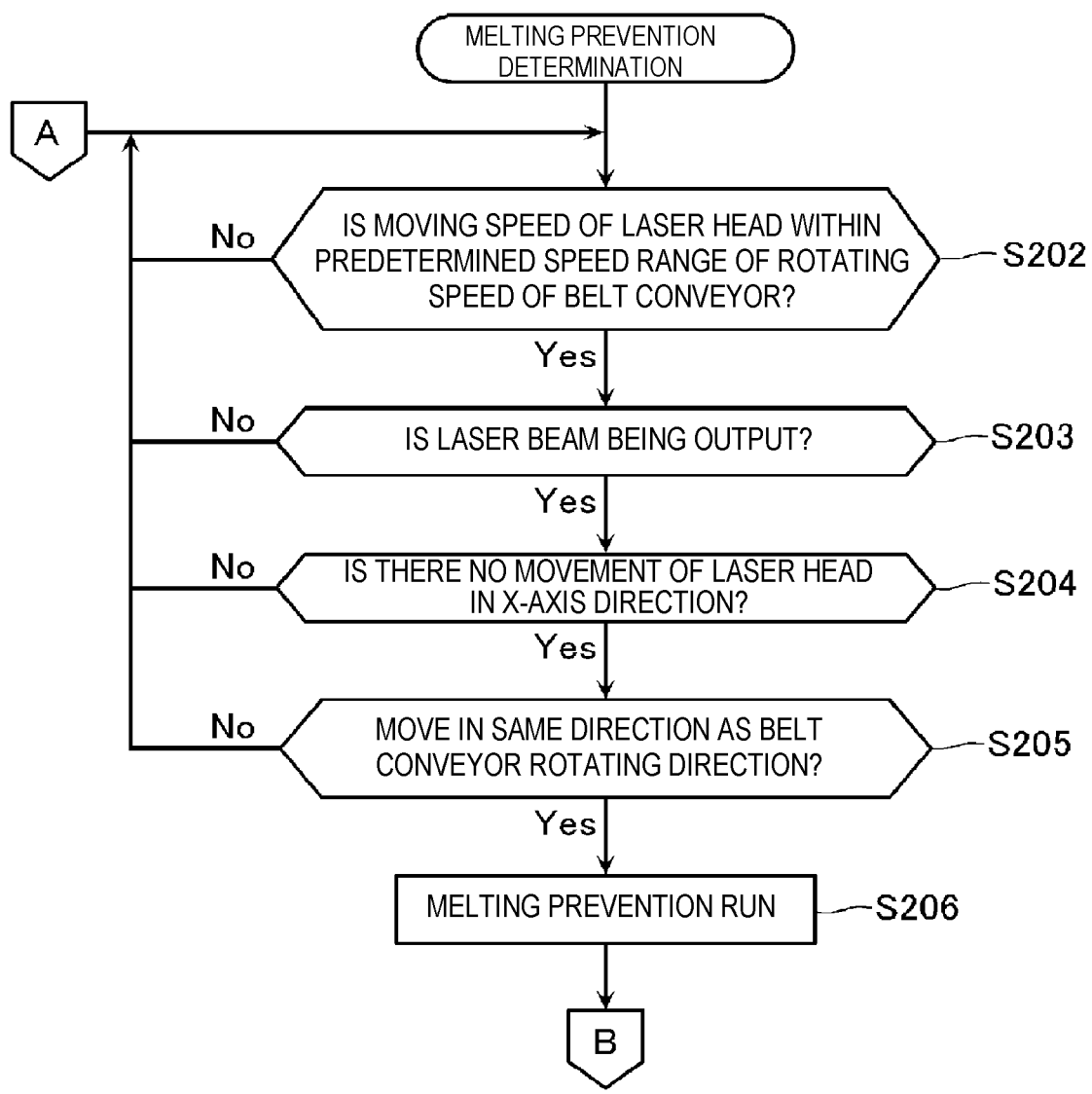
FIG. 4 is a flowchart showing the control method.

As shown in FIG. 4, in the melting prevention determining process, the control unit 13 first determines whether or not the moving speed of the laser head 11 matches the rotating speed of the belt conveyor 12 (step S202). Specifically, in this step S202, it is determined whether or not the moving speed of the laser head 11 is within a predetermined speed range of the rotating speed of the belt conveyor 12 (a preset range to the rotating speed) (e.g., the moving speed of the laser head 11 is within a range of ±20% of the rotating speed of the belt conveyor 12). For example, if the rotating speed of the belt conveyor 12 is 2800 mm/min, it is determined whether or not the moving speed of the laser head 11 is within a range of the speed of ±20% of this rotating speed, i.e., 2240 mm/min≤the moving speed≤3360 mm/min. Note that the rotating speed range (±20%) is set and stored as the parameter in the memory of the control unit 13, and freely set values can be changed and stored.

If it is determined in the step S202 that the moving speed of the laser head 11 is within the predetermined speed range (yes in the step S202), it is further determined whether or not the laser beam is being radiated (the laser beam is being output) (step S203). If it is determined that the laser beam is being radiated (yes in the step S203), it is determined whether or not the moving direction of the laser head 11 matches the rotating direction of the belt conveyor 12, i.e., whether there is no movement of the laser head 11 in the X-axis direction (step S204) and whether or not the laser head 11 moves in the same direction as the rotating direction of the belt conveyor 12 (step S205).

In this step S204, determination of "there is no movement of the laser head 11 in the X-axis direction" strictly includes not only the case where there is no movement of the laser head 11 in the X-axis direction but also a case where the laser head 11 moves at a moving speed that is the speed of 300 mm or less per minute in the X-axis direction as described above.

Then, if it is determined that there is no movement of the laser head 11 in the X-axis direction (yes in the step S204), it is determined whether or not the laser head 11 moves in the same direction as the rotating direction of the belt conveyor 12 (step S205). In this step S205, for example, when the rotating direction of the belt conveyor 12 is the +Y axis direction, "the same direction" includes not only a case where the moving direction of the laser head 11 is the +Y axis direction, strictly the same direction but also a case where the moving direction is a slightly inclined direction to the +Y axis direction, i.e., a direction in which the laser head 11 in the direction (the X-axis direction) orthogonal to the Y-axis direction in the horizontal plane moves at the moving speed that is a speed of 300 mm or less per minute.

If it is determined in the step S205 that the laser head 11 moves in the same direction as the rotating direction of the belt conveyor 12 (yes in the step S205), the step shifts to a melting prevention run (step S206). Note that if it is determined in the step S202 that the moving speed of the laser head 11 is not within the predetermined speed range (no in the step S202), if it is determined in the step S203 that the laser beam is not being radiated (no in the step S203), if it is determined in the step S204 that there is the movement of the laser head 11 in the X-axis direction (no in the step S204), and if it is determined in the step S205 that the laser head 11 does not move in the same direction as the rotating direction of the belt conveyor 12 (no in the step S205), the step shifts to the above step S200 to repeat the subsequent process.

Thus, in the melting prevention determining process, examples of determination conditions to execute the melting prevention run described later include a case where the rotating speed of the belt conveyor 12 is about the same as the moving speed of the laser head 11 and the rotating direction of the belt conveyor 12 is about the same as the moving direction of the laser head 11 (i.e., a case where the relative moving speed of the belt conveyor 12 and the laser head 11 is substantially zero (0)). Next, description will be made as to the melting prevention run.

[Melting Prevention Run of Belt Conveyor]

Here, an operation of repeating temporary stop and rotating operation of the belt conveyor 12 will be described as the melting prevention run.

Figure 5:
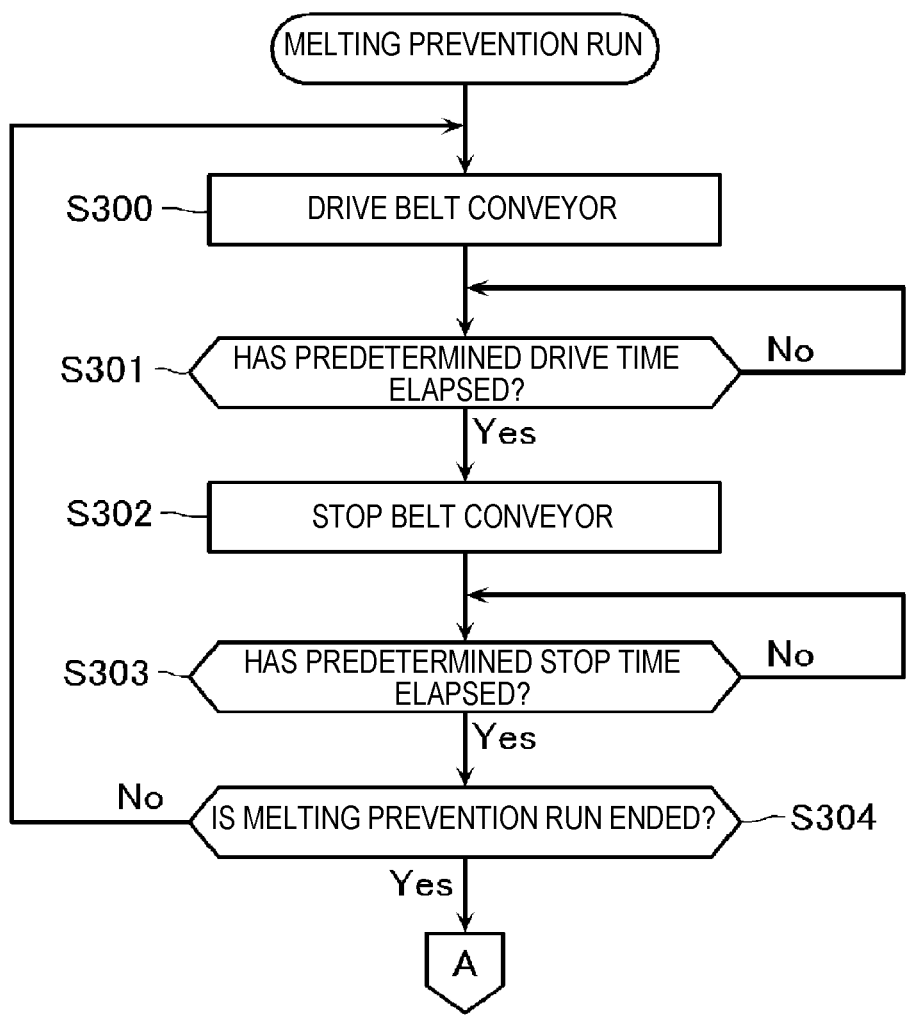
FIG. 5 is a flowchart showing the control method.

As shown in FIG. 5, upon shifting to the melting prevention run, the control unit 13 outputs the drive signal to the conveyor drive unit 12a, and drives the belt conveyor 12 in the direction used, for example, in the determination of the step S205 (step S300). Then, a driven state is maintained until a predetermined drive time (e.g., 10 seconds) elapses (no in step S301). If the time elapses (yes in the step S301), the control unit outputs the stop signal to the conveyor drive unit 12a, and stops the belt conveyor 12 (step S302).

Thus, after the belt conveyor 12 is stopped, a stopped state is maintained until a predetermined stop time (e.g., three seconds) elapses (no in step S303). If the time elapses (yes in the step S303), it is determined whether or not operation conditions to perform the melting prevention run (e.g., the determination conditions in the above described melting prevention determining process) are deviated, to determine whether or not to end the melting prevention run (step S304).

Figure 6:
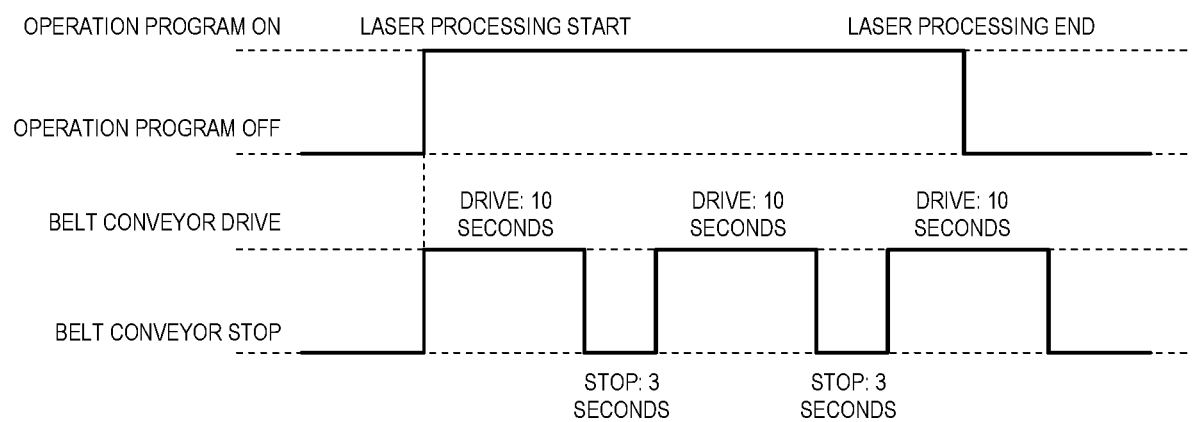
FIG. 6 is a timing chart showing an example of a melting prevention run in the control method.

If it is determined that the melting prevention run is not to be ended (no in the step S304), the step shifts to the above step S300 to continue the melting prevention run. FIG. 6 shows a timing chart of the melting prevention run by the temporary stop of the belt conveyor 12. In the timing chart shown in FIG. 6, while the laser head 11 is driven by the operation program to start and end the laser processing, the belt conveyor 12 is started to be driven for 10 seconds three times, and is stopped for three seconds twice. Note that this drive time and stop time are set and stored as parameters in the memory of the control unit 13, and freely set values can be changed and stored in accordance with the configurations of the laser processing machine 100 and the belt conveyor 12, the output of the laser oscillator 32 and the like.

That is, during the normal run, the belt conveyor 12 operates to continue rotating at a constant rotating speed in the +Y axis direction, but in the above melting prevention run, the belt conveyor 12 is run to intermittently repeat the operation for ten seconds and the stop for three seconds. This can prevent a portion of the belt 16 of the belt conveyor 12 from being intensively and continuously irradiated with the laser beam, and hence, the belt conveyor 12 can be prevented from being melted by the laser beam. Note that if it is determined to end the melting prevention run (yes in the step S304), the step shifts to the step S200 of the above described melting prevention determining process to repeat the subsequent process.

Note that in addition to the above described repeating of the temporary stop and rotating operation of the belt conveyor 12, an example of the melting prevention run is such an operation as described later.

[Another Example of Melting Prevention Run]

That is, examples of another melting prevention run include: under the control of the control unit 13, driving to repeat speed change (deceleration or acceleration) of the rotating speed of the belt conveyor 12, and driving to repeat inverting the rotating direction of the belt conveyor 12 (from + (forward) rotation to − (reverse) rotation, and from the − (reverse) rotation to the + (forward) rotation); and driving to repeat the output of the control signal from the control unit 13 to the head drive unit 11a and the temporary stop of the operation of the laser head 11 (and the irradiation with the laser beam). Note that, for example, the temporary stop of the operation of the laser head 11 may be performed in parallel with the above described control of various operations of the belt conveyor 12.

Furthermore, as for melting prevention, the above operation of the laser head 11 may be grasped in real time, and melting prevention determination may be performed to execute the melting prevention run if the operation matches the operation of the belt conveyor 12. Alternatively, the control unit 13 may analyze the operation program of the laser head 11 in advance, may calculate beforehand and grasp timing at which the moving direction and moving speed of the laser head 11 match the rotating direction and rotating speed of the belt conveyor 12, and may be triggered at this timing to execute the melting prevention run. Alternatively, in place of suitably executing the above melting prevention runs, for example, the control unit 13 may usually execute one of the above described melting prevention runs when the conveyor drive unit 12a operates.

As described above, according to the laser processing machine 100 of the present embodiment and the control method therefor, for example, the control unit 13 outputs the control signals to the head drive unit 11a and the conveyor drive unit 12a, respectively, to perform control so that the operation of the laser head 11 that radiates the laser beam is not synchronized with the operation of the belt conveyor 12 (so that a relative moving speed does not turn to zero). Consequently, it is possible to effectively prevent (the belt 16 of) the belt conveyor 12 from being melted by the laser beam, by use of existing equipment.

Second Embodiment

Next, description will be made as to a laser processing machine according to a second embodiment of the present invention. The laser processing machine according to the second embodiment is different from the laser processing machine 100 according to the first embodiment in the following respects. Note that the laser processing machine according to the second embodiment is common to the laser processing machine 100 according to the first embodiment in the other respects, and hence, description as to a configuration and control that are common to the embodiments is omitted.

It has been described in the laser processing machine 100 of the first embodiment described above that when the moving speed of the laser head 11 is "within the range of ±20%" of the rotating speed of the belt conveyor 12, it is determined that the moving speed of the laser head 11 matches the rotating speed of the belt conveyor 12.

Furthermore, it has been described in the laser processing machine 100 of the first embodiment described above that if the rotating direction of the belt conveyor 12 agrees with the moving direction of the laser head 11, and if the moving direction of the laser head 11 is the slightly inclined direction to the rotating direction of the belt conveyor 12 (if the laser head 11 in the direction orthogonal to the rotating direction of the belt conveyor 12 in the horizontal plane moves at the moving speed that is the speed of 300 mm or less per minute), it is determined that the moving direction of the laser head 11 matches the rotating direction of the belt conveyor 12.

That is, in the laser processing machine 100 according to the first embodiment described above, the matching determination of the speeds of the laser head 11 and the belt conveyor 12 and the matching determination of the directions of the laser head 11 and belt conveyor 12 are performed by different criteria.

On the other hand, the laser processing machine according to the second embodiment is configured to specify, from a moving direction and a moving speed of a laser head 11, a speed of a rotating direction component (+Y direction component) of the laser head 11 along a rotating direction (+Y direction) of a belt conveyor 12, and to determine that the moving direction and moving speed of the laser head 11 match the rotating direction and rotating speed of the belt conveyor 12, when the speed of the rotating direction component is within a preset range to the rotating speed of the belt conveyor 12. That is, the laser processing machine according to the second embodiment is configured to simultaneously perform the matching determination of the speeds of the laser head 11 and the belt conveyor 12 and the matching determination of the directions thereof, by use of the speed of the +Y direction component of the laser head 11. According to such a control method, it is possible to further simplify a determination process in a control unit 13.

In the laser processing machine according to the second embodiment, an example of a criterion of the matching determination of the directions and speeds of the laser head 11 and the belt conveyor 12 (the above described "within the preset range") is a criterion that a speed difference between the speed of the +Y direction component of the laser head 11 and the rotating speed of the belt conveyor 12 is less than 1400 mm per minute. According to this criterion, for example, in a case where the rotating speed of the belt conveyor 12 is 2800 mm per minute, if the speed of the +Y direction component of the laser head 11 is in excess of 1400 mm per minute and in a range less than 4200 mm per minute, it is determined that the direction and speed of the laser head 11 match those of the belt conveyor 12. On the other hand, for example, in a case where the rotating speed of the belt conveyor 12 is 3400 mm per minute, if the speed of the +Y direction component of the laser head 11 is in excess of 2000 mm per minute and in a range less than 4800 mm per minute, it is determined that the direction and speed of the laser head 11 match those of the belt conveyor 12.

Then, the laser processing machine according to the second embodiment is configured to determine that the direction and speed of the laser head 11 match those of the belt conveyor 12, if the speed difference between the speed of the +Y direction component of the laser head 11 and the rotating speed of the belt conveyor 12 is within the preset range (less than 1400 mm per minute), and to execute a melting prevention run so that the speed difference between both the speeds is out of the preset range (1400 mm or more per minute). Also, according to a control method for the laser processing machine of the second embodiment, it is possible to prevent the belt conveyor 12 from being melted by the laser beam.

Note that in place of executing the melting prevention run (temporary stop, speed change, switching of the rotating direction or the like) immediately after the matching determination of the directions and speeds, the laser processing machine according to the second embodiment is configured to execute the melting prevention run after a predetermined time has elapsed since it was determined that the moving direction and moving speed of the laser head 11 matched the rotating direction and rotating speed of the belt conveyor 12 (e.g., after an operation for two seconds).

According to the laser processing machine of the second embodiment, it is possible to minimize temporary stop of the belt conveyor 12 or the laser head 11, or the like. That is, in the configuration to execute the melting prevention run (the temporary stop, the speed change, the switching of the rotating direction or the like) immediately after the matching determination of the directions and speeds, even in a case where the belt conveyor 12 is unlikely to be melted by laser beam, such as a case where a small-size product is repeatedly cut, for example, the belt conveyor 12 or the laser head 11 is frequently and temporarily stopped every time the direction and speed of the laser head 11 match those of the belt conveyor 12. There is concern that failure of a device or lengthening of a processing time is caused. On the other hand, in the laser processing machine according to the second embodiment, a predetermined time lag is provided between the matching determination and the execution of the melting prevention run. Consequently, it is possible to prevent a power source from being frequently and repeatedly turned on/off, for example, in the case where the small-size product is repeatedly cut.

The embodiments of the present invention have been described above, but these embodiments are presented as examples, and are not intended to restrict a scope of invention. The novel embodiments can be implemented in various other aspects, and can be variously omitted, replaced or changed without departing from the scope of the invention. These embodiments and modifications thereof are included in the scope or summary of the invention, and are included in the invention described in claims and its equivalent scope.

Figure 7:
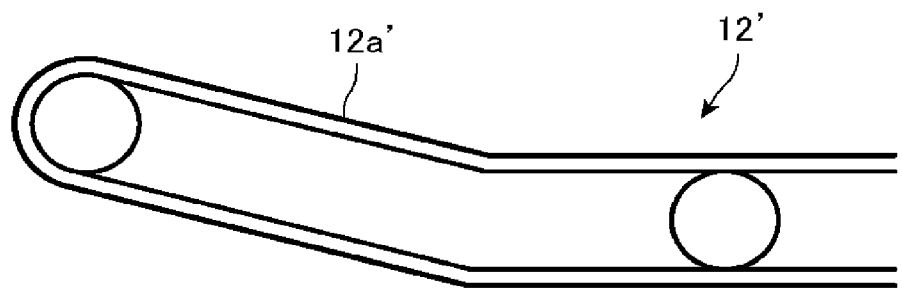
FIG. 7 is a view schematically showing another example of a belt conveyor.

For example, the belt conveyor may be, as shown in FIG. 7, an inclined conveyor 12' with an end 12a' on a downstream side in a rotating direction being inclined upward. According to the inclined conveyor 12', a large space can be formed under the end 12a' on the downstream side of the rotating direction, and hence, the storage box 24 having a large storage capacity may be disposed in the space. Furthermore, discharging means such as a discharge conveyor may be disposed under the end 12a'.

REFERENCE SIGNS LIST 1 frame
10 pallet
11 laser head
11a head drive unit
12 belt conveyor
12a conveyor drive unit
12' inclined conveyor
12a' end on a downstream side in a rotating direction
13 control unit
15 rotating roller
16 belt
17 upper frame
18 Y-axis movement mechanism
19 X-axis movement mechanism
24 storage box
32 laser oscillator
100 laser processing machine

The invention claimed is:

1. A laser processing machine comprising:
a laser head configured to irradiate a workpiece with laser beam;
a belt conveyor provided away in an irradiation direction of the laser beam; and
a control unit configured to control operations of the laser head and the belt conveyor, wherein
the laser head is configured to be movable along at least a conveying direction of the belt conveyor and an inclined direction to the conveying direction of the belt conveyor,
the control unit is configured to determine whether or not a condition of a melting prevention run being satisfied, and in a case where it is determined that the condition of the melting prevention run is satisfied, to execute the melting prevention run to at least one of the laser head and the belt conveyor,
the melting prevention run is a run to avoid a relative moving speed of the laser head and the belt conveyor to turn to zero, and
the condition of the melting prevention run contains: a condition that a moving direction of the laser head and a conveying direction of the belt conveyor during the irradiation with the laser beam having a relationship the following (i) or (ii); and a condition that the moving speed of the laser head is within a preset range to the rotating speed of the belt conveyor during the irradiation with the laser beam
(i) in a case where the conveying direction of the belt conveyor agrees with the moving direction of the laser head
(ii) in a case where the moving direction of the laser head is the inclined direction to the conveying direction of the belt conveyor, and a moving speed of the laser head in orthogonal to the conveying direction of the belt conveyor is less than or equal to a preset speed.

2. The laser processing machine according to claim 1, wherein the laser head is configured to operate based on a preset operation program,
the belt conveyor is configured to continuously operate in a preset conveying direction and at a preset rotating speed, and
the control unit analyzes the operation program and calculates beforehand a timing at which the condition of the melting prevention run is satisfied, and is triggered at the timing to execute the melting prevention run.

3. A laser processing machine comprising:
a laser head configured to irradiate a workpiece with laser beam;
a belt conveyor provided away in an irradiation direction of the laser beam; and
a control unit configured to control operations of the laser head and the belt conveyor, wherein
the laser head is configured to be movable along at least a conveying direction of the belt conveyor and an inclined direction to the conveying direction of the belt conveyor,
in a case where the moving direction of the laser head is the inclined direction to the conveying direction of the belt conveyor, from the moving direction and moving speed of the laser head during the irradiation with the laser beam, the control unit specifies a speed of a conveying direction component of the laser head along the conveying direction of the belt conveyor, the control unit is configured to determine whether or not a condition of a melting prevention run being satisfied, and in a case where it is determined that the condition of the melting prevention run is satisfied, to execute the melting prevention run to at least one of the laser head and the belt conveyor, the melting prevention run is a run to avoid a relative moving speed of the laser head and the belt conveyor to turn to zero, and the condition of the melting prevention run contains a condition that the speed of the conveying direction component is within a preset range to the rotating speed of the belt conveyor.

4. The laser processing machine according to claim 1, wherein the melting prevention run includes a control for repeating temporary stop of the operation and a rotating operation of the belt conveyor.

5. The laser processing machine according to claim 1, wherein the melting prevention run includes a control for repeating speed change of the rotating speed of the belt conveyor.

6. The laser processing machine according to claim 1, wherein the melting prevention run includes a control for repeating forward rotation and reverse rotation in the conveying direction of the belt conveyor.

7. The laser processing machine according to claim 1, wherein the melting prevention run includes a control for repeating the operation of the laser head and temporary stop and movement of the irradiation with the laser beam.

8. The laser processing machine according to claim 4, wherein the melting prevention run is executed after a predetermined time has elapsed since the condition of the melting prevention run being satisfied.

9. A control method of using the laser processing machine according to claim 1, the control method comprising:

determining whether or not a condition of a melting prevention run is satisfied by the control unit, in a case where it is determined that the condition of the melting prevention run is satisfied, executing the melting prevention run to at least one of the laser head and the belt conveyor by the control unit, the melting prevention run is a run to avoid a relative moving speed of the laser head and the belt conveyor to turn to zero, and the condition of the melting prevention run contains: a condition that a moving direction of the laser head and the conveying direction of the belt conveyor during the irradiation with the laser beam having a relationship the following (i) or (ii); and a condition that the moving speed of the laser head is within a preset range to the rotating speed of the belt conveyor during the irradiation with the laser beam (i) in a case where the conveying direction of the belt conveyor agrees with the moving direction of the laser head (ii) in a case where the moving direction of the laser head is the inclined direction to the conveying direction of the belt conveyor, and a moving speed of the laser head in orthogonal to the conveying direction of the belt conveyor is less than or equal to a preset speed.

10. The control method according to claim 9, further comprising analyzing an operation program of the laser head and calculating beforehand timing at which the condition of the melting prevention run is satisfied, wherein in the executing, the execution of the melting prevention run is triggered at the timing.

11. A control method of using the laser processing machine according to claim 3, the control method comprising:

in a case where the moving direction of the laser head is the inclined direction to the conveying direction of the belt conveyor, from the moving direction and moving speed of the laser head during the irradiation with the laser beam, specifying a speed of a conveying direction component of the laser head along the conveying direction of the belt conveyor by the control unit; and determining whether or not a condition of a melting prevention run is satisfied by the control unit, in a case where it is determined that the condition of the melting prevention run is satisfied, executing the melting prevention run to at least one of the laser head and the belt conveyor by the control unit, the melting prevention run is a run to avoid a relative moving speed of the laser head and the belt conveyor to turn to zero, and the condition of the melting prevention run contains a condition that the speed of the conveying direction component is within a preset range to the rotating speed of the belt conveyor.

12. The control method according to claim 9, wherein the melting prevention run includes a control for repeating temporary stop of the operation and a rotating operation of the belt conveyor.

13. The control method according to claim 9, wherein the melting prevention run includes a control for repeating speed change of the rotating speed of the belt conveyor.

14. The control method according to claim 9, wherein the melting prevention run includes a control for repeating forward rotation and reverse rotation in the conveying direction of the belt conveyor.

15. The control method according to claim 9, wherein the melting prevention run includes a control for repeating the operation of the laser head and temporary stop and movement of the irradiation with the laser beam.

16. The control method according to claim 9, wherein the melting prevention run is executed after a predetermined time has elapsed since the condition of the melting prevention run being satisfied.

17. The laser processing machine according to claim 3, wherein the melting prevention run includes a control for:

repeating temporary stop of the operation and a rotating operation of the belt conveyor;

repeating speed change of the rotating speed of the belt conveyor;

repeating forward rotation and reverse rotation in the conveying direction of the belt conveyor; or repeating the operation of the laser head and temporary stop and movement of the irradiation with the laser beam.

* * * * *